United States Patent [19]

Ohishi et al.

[11] Patent Number: 4,644,563
[45] Date of Patent: Feb. 17, 1987

[54] DATA TRANSMISSION METHOD AND SYSTEM

[75] Inventors: Shiro Ohishi; Masatsugu Shinozaki, both of Hadano, Japan

[73] Assignee: Hitachi, Ltd., Tokyo, Japan

[21] Appl. No.: 389,073

[22] Filed: Jun. 16, 1982

[30] Foreign Application Priority Data

Jun. 19, 1981 [JP] Japan .................. 56-94930

[51] Int. Cl.$^4$ ........................................... H04L 25/49
[52] U.S. Cl. ........................ 375/17; 375/20; 375/23; 375/121
[58] Field of Search ................ 332/9 R, 37 R, 9 T, 332/11 R, 10; 375/17, 18, 20, 23, 37, 49, 55, 25, 27, 21, 68, 121, 22; 360/40, 39, 41, 43, 48; 340/870.19, 870.2, 870.22, 825.65, 825.57, 825.6, 825.62

[56] References Cited

U.S. PATENT DOCUMENTS

| 2,464,667 | 3/1949 | Boosman et al. | 375/68 |
|---|---|---|---|
| 2,917,726 | 12/1959 | Golden et al. | 360/40 |
| 3,154,777 | 10/1964 | Thomas | 375/17 |
| 3,214,749 | 10/1965 | Karnaugh | 375/17 |
| 3,276,033 | 9/1966 | Cogar et al. | 360/40 |
| 3,489,853 | 1/1970 | Lang | 375/22 |
| 3,510,780 | 5/1970 | Buehrle | 375/22 |
| 3,622,807 | 11/1971 | Gillet et al. | 375/119 |
| 3,631,463 | 12/1971 | Murphy | 375/20 |
| 3,683,277 | 8/1972 | Kuller et al. | 375/49 |
| 3,798,608 | 3/1974 | Huebner | 375/36 |
| 4,071,692 | 1/1978 | Weir et al. | 375/17 |
| 4,263,670 | 4/1981 | Sherman | 375/9 |
| 4,337,457 | 6/1982 | Tache | 371/56 |
| 4,352,095 | 9/1982 | Assard | 375/17 |
| 4,450,571 | 5/1984 | Hirayama et al. | 375/7 |

Primary Examiner—Benedict V. Safourek
Attorney, Agent, or Firm—Antonelli, Terry & Wands

[57] ABSTRACT

For transmitting binary data at a data transmission speed of $F=1/[(N+1)T]$ bits/second, where N represents a value selected in accordance with a given transmission speed and T represents a predetermined constant period, a transmitter station sends out a bipolar signal on a transmission line for the period T (seconds) corresponding to one of the states of the binary data independent of the data transmission speed, while no data is sent out on the transmission speed, while no data is sent out on the transmission line for the period NT (seconds) as well as for a period corresponding to the other state of the binary data. In a receiving station, the binary states of the data are discriminatively determined from the bipolar signal received through the transmission line in accordance with the data transmission speed F, the data being converted to a unipolar signal such as NRZ signal.

16 Claims, 6 Drawing Figures

FIG. 6

| N | TRANSMITTING /RECEIVING CLOCK PERIOD | A | B | C | D |
|---|---|---|---|---|---|
| 1 | 2T | H | H | H | L |
| 2 | 3T | H | H | L | H |
| 3 | 4T | H | H | L | L |
| 4 | 5T | H | L | H | H |
| 5 | 6T | H | L | H | L |
| 6 | 7T | H | L | L | H |
| 7 | 8T | H | L | L | L |
| 8 | 9T | L | H | H | H |
| 9 | 10T | L | H | H | L |
| 10 | 11T | L | H | L | H |
| 11 | 12T | L | H | L | L |
| 12 | 13T | L | L | H | H |
| 13 | 14T | L | L | H | L |
| 14 | 15T | L | L | L | H |
| 15 | 16T | L | L | L | L |

DATA TRANSMISSION METHOD AND SYSTEM

BACKGROUND OF THE INVENTION

This invention relates to a data transmission method and a data transmission system and particularly to those systems suitable for use in transmitting data at different transmission speeds on the same transmission line.

In the prior art, NRZ signals, bipolar signals and the like are used for serially transmitting data in the form of base band signals. However, in transmitting serial data in such form of signal wave over a long distance, a significant pulse width included in the signal waveform is dependent on the transmission speed of the data, and thus the following problems may occur.

First, since long-distance transmission of a signal on the transmission line causes the signal waveform to be distorted due to the characteristic of the line, interference between codes may occur in the binary state of the signal, preventing the binary states from being accurately discriminated.

Secondly, when data is transmitted at different transmission speeds on the same transmission line, the significant pulse width included in the transmitted signal waveform is changed depending on the transmission speeds, and thus to prevent mismatching (reflection or the like) between the transmission line characteristic and signal waveform, it is necessary to provide a circuit to terminate the line for matching to the line characteristic at each transmission speed, in the data receiving circuit, or to restrict the transmission speed.

SUMMARY OF THE INVENTION

It is an object to provide a data transmission method and system with the above drawbacks obviated, and in which the interference between codes is almost prevented from occuring in the binary states of the signal so that the binary states of the signal can be discriminated accurately, or substantially no data error occurs, even if a distortion occurs in the transmitted signal waveform, and it is unnecessary to terminate the line, considering the line characteristic at each transmission speed even if data is transmitted at different transmission speeds.

Thus, according to this invention, there is provided a data transmission system for transmitting data at a transmission speed given by $F=1/\{(N+1)\}$ (bits/sec) where $N>0$, wherein on the transmitting side, a bipolar signal, for example, is sent on a transmission line during a constant period of time T (sec) forming part of the bit time of the data irrespective of the transmission speed of the data in response to one of the binary states of the data but no signal is sent on the line during the other portion N·T (sec) of the bit time, and in response to the other of the binary states, no signal is sent on the line; while on the receiving side, the binary states of the transmitted data are discriminated by the presence or absence of a bipolar signal on the line in accordance with the data transmission speed F, the data is converted to, for example, a NRZ signal and a receiving clock signal is generated for sampling this NRZ signal.

Thus, according to this invention, since no signal is sent during the N·T period after the bipolar data signal is sent, interference between codes is substantially eliminated even if a distortion is introduced in the signal waveform. Moreover, there is no need to consider the transmission line characteristic at each transmission speed. Particularly, if a bipolar signal is sent, the signal waveform distortion is reduced further.

BRIEF DESCRIPTION OF THE DRAWINGS

FIG. 6 shows the relation between the transmission speed and the speed control signal.

DESCRIPTION OF THE PREFERRED EMBODIMENTS

Figure 1:
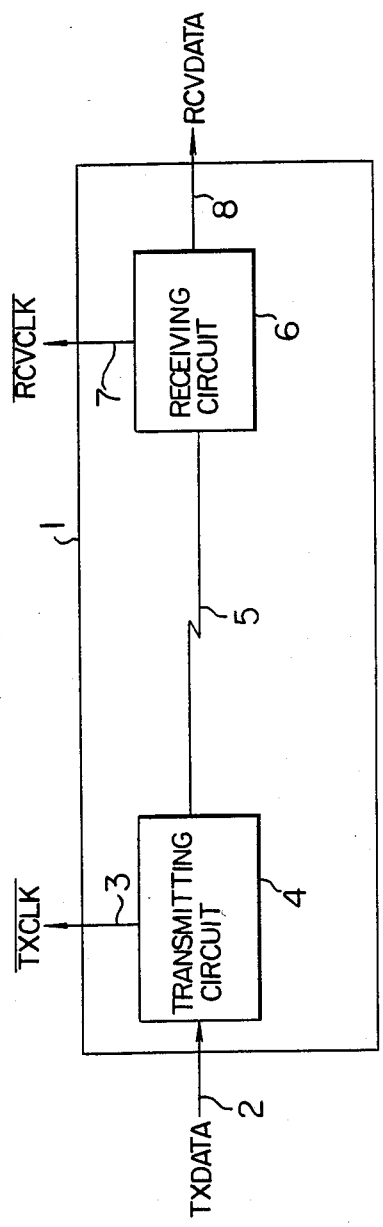
FIG. 1 shows the whole of a data transmission system.

FIG. 1 shows the overall data transmission system according to this invention. Referring to FIG. 1, a data transmission system 1 includes a transmitting circuit 4, a transmission line 5, and a receiving circuit 6. The transmitting circuit 4 sends a transmission clock signal (TXCLK) 3, and a serial data signal (TXDATA) 2 in the form of an NRZ signal is supplied to the transmitting circuit 4 in synchronism with the trailing edge of the clock signal 3. The receiving circuit 6 converts a signal on the transmission line 5 into a NRZ signal and produces the NRZ signal as a received data signal (RCVDATA) 8. In addition, the receiving circuit 6 produces a received clock signal (RCVCLK) 7 in synchronism with the data signal 8. The received data signal 8 is sample at the trailing edge of the received clock signal 7.

Figure 2:
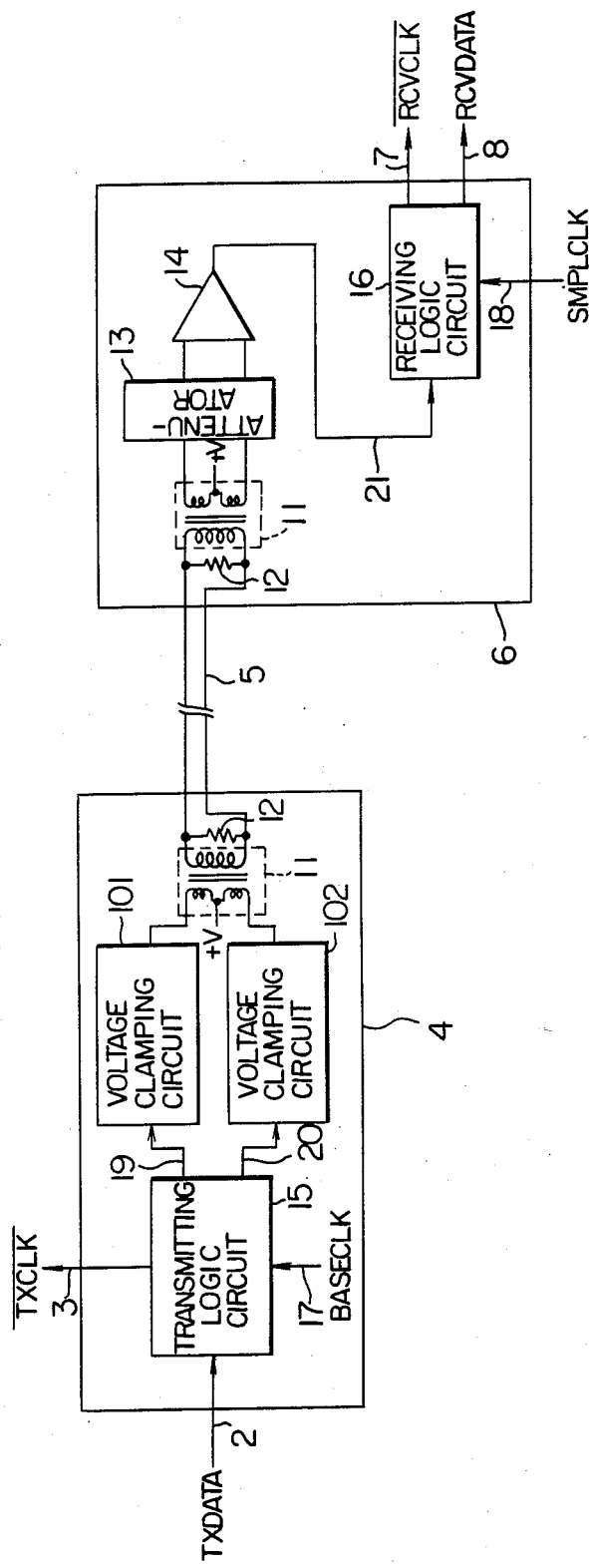
FIG. 2 is a detailed diagram of a data transmission system according to this invention.
Figure 3:
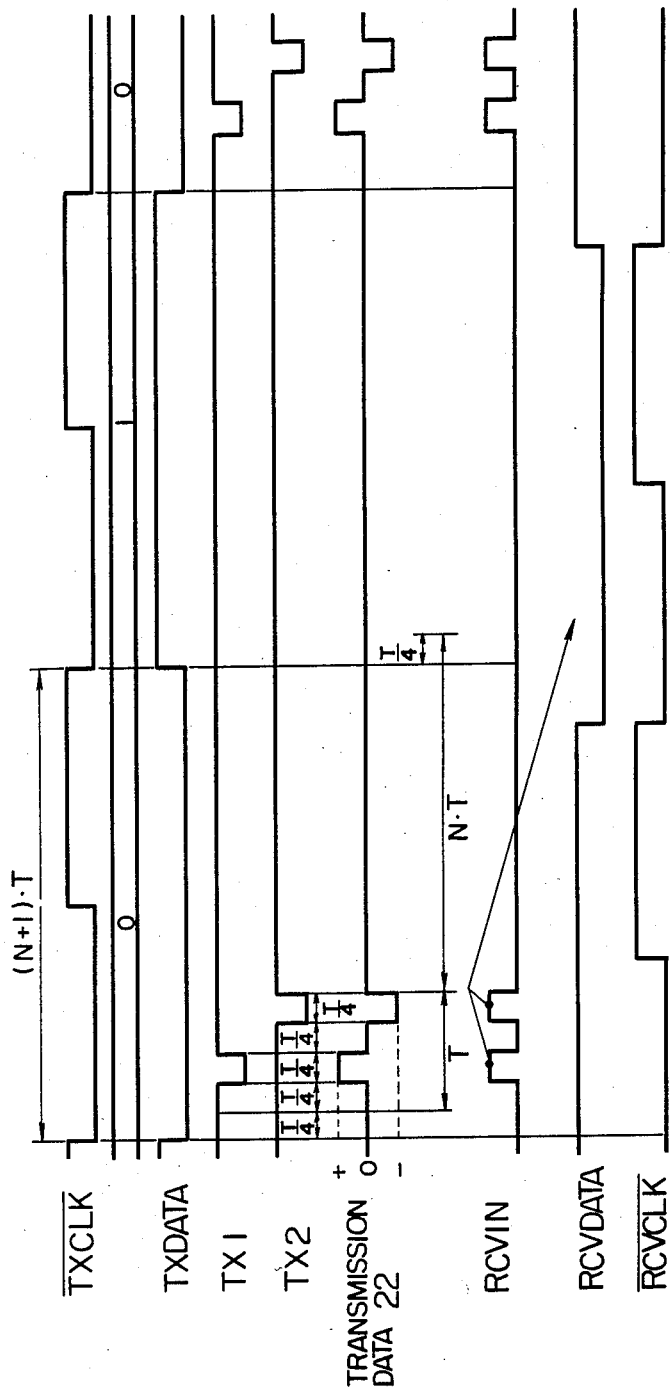
FIG. 3 is a waveform diagram showing a waveform at each point in FIG. 2.

FIG. 2 is a detailed block diagram of the data transmission system of FIG. 1, and FIG. 3 is a waveform diagram showing each signal waveform in FIG. 2. It is assumed that 15 different data transmission speeds, $F=1/\{(N+1)\cdot T\}$ (bits/sec), where N=1, 2, 3, ... 15 selected in accordance with the transmission speed and T is a constant independent of the transmission speed. FIG. 3 is an example for N=3.

A transmitting logic circuit 15 is supplied with a fundamental transmission clock signal of period T/4 (BASECLK) 17, so as to produce the transmission clock signal (TXCLK) 3 in response to the clock signal 17. The transmission data signal (TXDATA) 2 in the form of a NRZ signal is received by the logic circuit 15 in synchronism with this transmission clock signal 3. This transmitting logic circuit 15 produces first and second transmission outputs (TX1) 19 and (TX2) 20 during the period T of one bit time of the data (time necessary for 1 bit of data to be transmitted and received) which one bit time includes the two periods T and N·T as shown in FIG. 3 during the "0" state of the transmission data 2, the period T being independent of the transmission speed. These outputs 19 and 20 are supplied through voltage clamping circuits 101 and 102 to a pulse transformer 11, respectively. Then, the pulse transformer 11 sends the bipolar signal as a transmission data signal 22 to the transmission line 5. During the N·T period, which is dependent on the transmission speed, the transmission outputs 19 and 20 are generated from the logic circuit 15 and thus no significant signal is sent on the transmission line 5. When the transmission data signal 2 is "1", the logic circuit 15 produces no outputs 19 and 20 during one bit time, or (N+1)·T of data, and thus no signal is sent on the line 5. The transmission line 5 is terminated by a terminal resistance 12.

The transmission data signal 22 from the transmission circuit 4 is transmitted on the line 5 and supplied to the receiving circuit 6. In the receiving circuit 6, the transmission data 22 is received by the pulse transformer 11, attenuated by an attenuator 13 and then supplied to a sense amplifier 14. The sense amplifier 14 converts the bipolar signal sent as the transmission data signal 22 from the circuit 4 into two pulses of the same polarity, which are then supplied as a received input signal (RCVIN) 21 to a receiving logic circuit 16. To the logic circuit 16 is also supplied a received sampling clock signal (SMPLCLK) 18 of period T/16. The received input 21 is sampled at each pulse of the clock 18. When two consecutive pulses of the same polarity are detected in the received input 21, the received data signal (RCVDATA) 8 is turned to "0" and also the received clock signal 7 is controlled to be in synchronism with the received data signal 8 so that the received data signal 8 can be sampled at the trailing edge of the received clock signal (RCVCLK) 7. Subsequently, when the two consecutive pulses of the same polarity are not detected in the received input 21 after a lapse of 1 bit time, the received data turns to "1".

Figure 4:
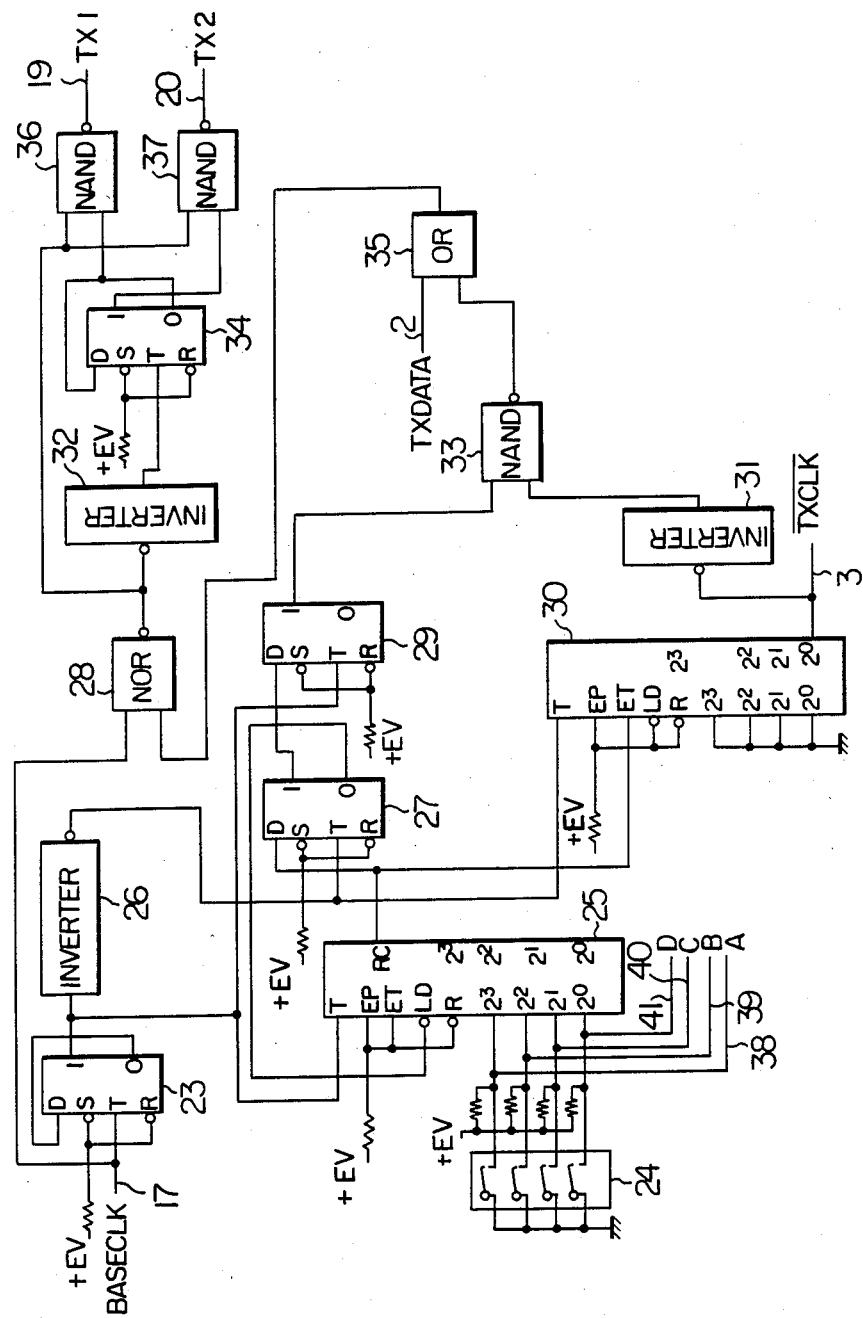
FIG. 4 is a specific arrangement of the transmitting logic circuit in FIG. 3.

FIG. 4 shows a specific arrangement of the transmitting logic circuit 15.

Referring to FIG. 4, the fundamental transmission clock signal 17 of pulse width T/4 and duty ratio of 50% is applied to the T-input of a flip-flop 23 and a NOR circuit 28. This flip-flop 23 produces at its "1" output terminal the clock 17 divided in frequency by 2. The "1" output of the flip-flop 23 is connected to the T-inputs of a synchronous counter 25 and flip-flop 29. The "1" side output of the flip-flop 23 is inverted by an inverter 26 and then applied to the T-inputs of a flip-flop 27 and synchronous counter 30. The "0" side output of the flip-flop 23 is fed back to its own D-input.

The synchronous counter 25 is a programmable counter, the inputs of $2^3$ to $2^0$ of which are connected to a transmission speed control switch 24. This switch 24 specifies speed control signals 38 to 41 by using 4 bit digital values A to D. FIG. 6 shows the relation between the speed control signals A, B, C, D and transmission speed $1/\{(N+1)\cdot T\}$ (N=1, 2, 3 ... 15). H represents the high level, and L the low level. Also, the synchronous counter 30 is a programmable counter, the $2^3$ to $2^0$ inputs of which are fixed to "L" in advance.

The RC output of the synchronous counter 25 becomes "H" during T once at each $(N+1)\cdot T/2$ in accordance with the speed control signals of the $2^3$ to $2^0$ inputs, and is applied to the D-input of the flip-flop 27. The "0" side output of the flip-flop 27 is fed back to the LD input of the synchronous counter 25. Also, the RC output of the synchronous counter 25 is applied to the ET input of the synchronous counter 30. As a result, the synchronous counter 30 produces at the $2^0$ output the transmission clock (TXCLK) 3 of period $(N+1)\cdot T$ and duty ratio 50%.

On the other hand, the "1" side output of the flip-flop 27 is connected to the D-input of a flip-flop 29, and the "1" side output of the flip-flop 29 is connected to one input of a NAND circuit 33. To the other input of the NAND circuit 33 is applied a signal into which the $2^0$ output of the synchronous counter 30 is inverted by an inverter 31. The flip-flop 29 shifts the RC output of the synchronous counter 25 by T/2 to produce "H" at the "1" side output during period T after a lapse of T/4 from the leading edge and trailing edge of the transmission clock 3. Thus, the output of the NAND circuit 33 becomes "L" during period T once at each period $(N+1)\cdot T$ of the clock 3 after a lapse of T/4 from the trailing edge of the clock 3. The output of the NAND circuit 33 and the transmission data 2 are applied to an OR circuit 35.

The transmission data 2 is changed in synchronism with the trailing edge of the clock 3. When the data 2 is "0" or "L", the output of the OR circuit 35 becomes "L" during the period "T" after a lapse of T/4 from the trailing edge of the clock 3. The output of the OR circuit 35 and fundamental clock 17 are applied to a NOR circuit 28. As a result, the output of the NOR circuit 28 becomes "H" during T/4 after the lapse of T/2 from the trailing edge of the clock 3. The output of the NOR circuit 28 is applied to the first inputs of NAND circuits 36 and 37, and also through an inverter 32 to the T-input of a flip-flop 34. The "0" side output of the flip-flip 34 is fed back to its own D-input, and at the same time is applied to the other input of the NAND circuit 36. The "1" side output of the flip-flop 34 is applied to the other input of the NAND circuit 37.

If now the "0" side output of the flip-flop 34 is "H", the first transmission output (TX1) 19 becomes "L", as shown in FIG. 3, only when the NOR circuit 28 produces an output of "H". When the output of the NOR circuit 28 falls, the "1" side output of the flip-flop 34 becomes "H" and the "0" side output thereof is "L". The output of the NOR circuit 28 becomes "H" during T/4 after a lapse of T from the trailing edge of the clock signal 3. At this time, since the "1" side output of the flip-flop 34 is "H", the second transmission output (TX2) 20 is "L". During the period in which the transmission outputs 19 and 20 are "L", the bipolar signal of transmission data 22 shown in FIG. 3 is sent from the circuit 4 to the line 5. During the remaining period in which the transmission data is "0", that is, during the period of $(N-\frac{1}{4})T$ after the lapse of 5T/4 from the trailing edge (the fall) of the clock signal 3, and during the period in which the tarnsmission data is "1" or "H", the output of the OR circuit 35 remains "H", and thus the output of the NOR circuit 28 stays "L", the transmission outputs 19 and 20 never becoming "L". Therefore, no significant signal is sent on the line 5.

Figure 5:
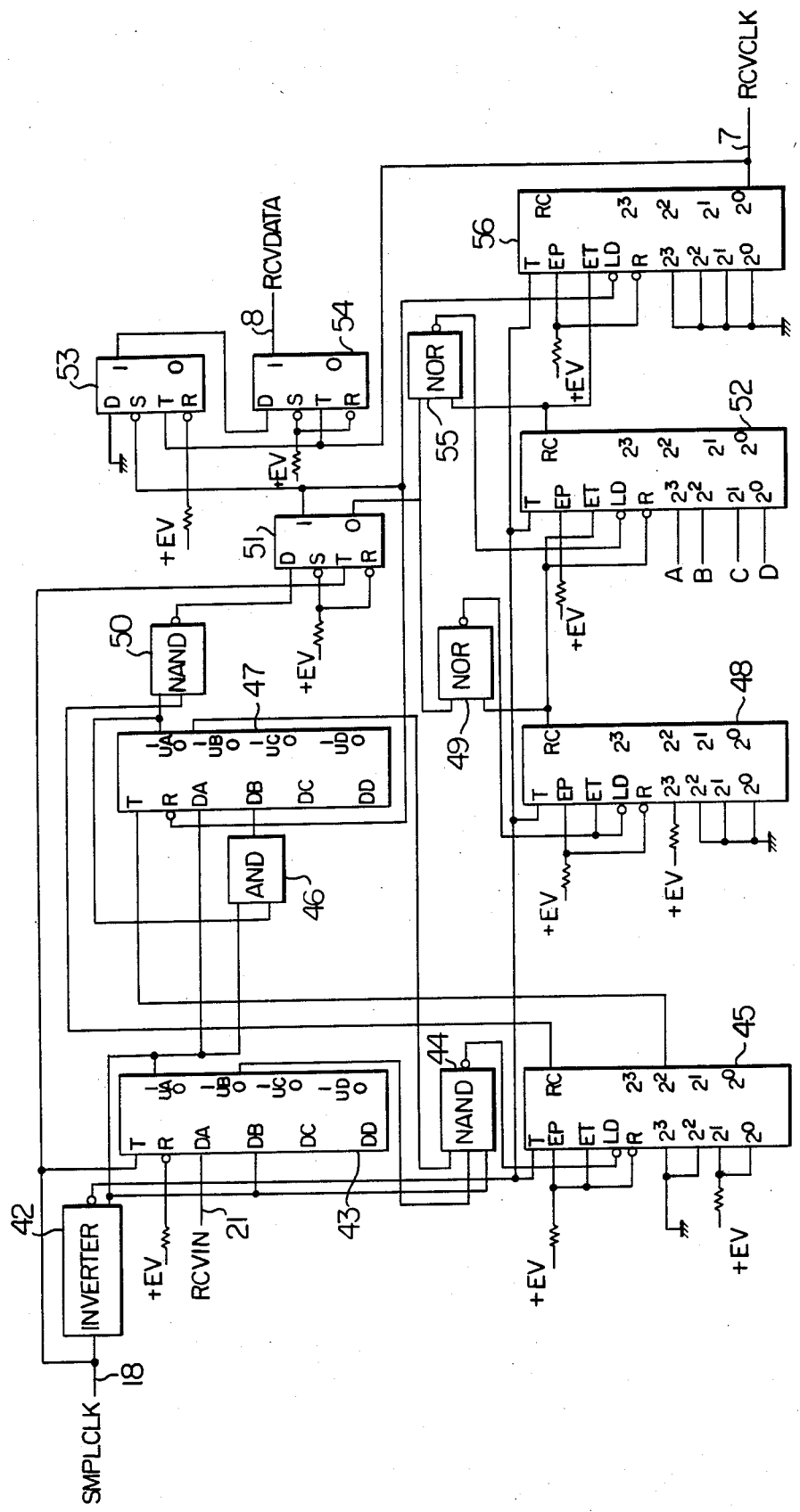
FIG. 5 is a specific arrangement of the receiving logic circuit in FIG. 3.

FIG. 5 shows a specific arrangement of the receiving logic circuit 16. Referring to FIG. 5, the received input signal (RCVIN) 21 is applied to the DA end of a flip-flop 43. The receiving sampling clock signal 18 is applied to the T-inputs of an inverter 42, flip-flop 43, and flip-flop 51. This received input signal 21 is synchronized with the received sampling clock signal (SMPLCLK) 18 of period T/16 which is applied to the T-input of the flip-flop 43, and produced at the UA-1 output of the flip-flop 43. The output at UA-1 of the flip-flop 43 is applied to the DA input of a flip-flop 47 and at the same time the UA-1 output of the flip-flop 43 and UA-1 output of the flip-flop 47 are applied to an AND circuit 46. The output of the AND circuit 46 is applied to the DB input of the flip-flop 47. The UA-1 output of the flip-flop 43 is fed back to the DB input of the flip-flop 43, and applied to a NAND circuit 44. To the other input ends of the NAND circuit 44 are applied the UB-0 output of the flip-flop 43 and the UA-0 output of the flip-flop 47, respectively. The clock signal 18 is inverted by an inverter 42 and then applied to the T inputs of synchronous counters 45, 48, 52 and 56.

When the received input 21 is changed from "L" to "H", the UA-1 output of the flip-flop 43 is also "H", and the output of the NAND circuit 44 becomes "L" during the interval of a single clock pulse from the leading edge of the clock 18, or during T/16. The output of the NAND circuit 44 is connected to the LD input of the synchronous counter 45. The synchronous counter 45 operates in synchronism with the received input which is synchronized with the leading edge of the receiving sampling clock signal 18, or the leading edge of the UA-1 output of the flip-flop 43, to produce $2^2$-output which is used for sampling the UA-1 output of the flip-flop 47 at time points 3T/32, and 19T/32 from the leading edge of the output. When the sampled results at the two points are both "H" and the RC output of the synchronous counter 45 is "H", a NAND circuit 50 to which the RC output of the synchronous counter 45 and the UA-1 output of the flip-flop 47 are applied becomes "L". Thus, the "1" side output of a flip-flop 51 connected to the NAND circuit 50 becomes "L" during the interval of a single clock (T/16) from the leading edge of the clock signal 18. Here, during the period in which the UA-0 output of the flip-flop 47 is "L", the synchronous counter 45 is not synchronized with the received input signal 21 since the receiving logic circuit 16 is sampling two successive pulses.

The "1" side output of the flip-flop 51 is connected to the S-input of a flip-flop 53, the R-input of a flip-flop 47, and the LD input of a synchronous counter 56. When the "1" side output of the flip-flop 51 becomes "L", the flip-flop 53 stores the received data of "0". At the same time, since the received clock signal (RCVCLK) 7 is produced, the synchronous counters 48, 52 and 56 are synchronized with the received data. Thus, the "0" side output of the flip-flop 52 is applied through the NOR circuit 49 to the LD input of the synchronous counter 48, and the RC output of the synchronous counter 48 becomes "H" at each ·T/2. The RC-output of the synchronous counter 48 is connected to the NOR circuit 49 and the ET input of the synchronous counter 52. The "0" side output of the flip-flop 51 is connected through the NOR circuit 55 to the LD-input of the synchronous counter 52. The RC output of the synchronous counter 52 becomes "H" at each (N+1)·T/2 in response to the state of the speed control signals A, B, C and D as shown in FIG. 6. The RC output of the synchronous counter 52 is applied to the NOR circuit 55 and the ET input of the synchronous counter 56. The "1" side output of the flip-flop 51 is connected to the LD input of the synchronous counter 56, and the $2^3$ to $2^0$ inputs of the synchronous counter 56 are fixed to "L". Thus, the $2^0$ output of the synchronous counter 56 is the receiving clock signal (RCVCLK) 7 of the period (N+1)·T synchronized with the received data and a duty ratio of 50%.

The received clock signal 7 is applied to the T-inputs of the flip-flops 53 and 54, and the "1" side output of the flip-flop 53 is connected to the D-input of the flip-flop 54. Thus, at the leading edge of the clock signal 7, the contents of the flip-flop 53 are transferred to the flip-flop 54, which then produces at the "1" side output the received data (RCVDATA) 8 of "0" or "L", and also the data stored in the flip-flop 53 is cleared. If the received input 21 remains "L" during 1 bit time, or (N+1)·T, the "1" said output of the flip-flop 51 stays also "1", or "H". The received data 8 thus generated can be sampled at the next trailing edge of the received clock signal 7.

While the illustrated embodiment is for N=1 to 15 the cases of larger values of N can be realized similarly.

Thus, according to this embodiment, since the bipolar signal is sent during the period T in accordance with one of the significant states of transmission data and data is not sent during the period N·T, it is not necessary to consider the transmission line characteristic for each transmission speed. In other words, as shown in FIG. 6, to increase the transmission speed, the transmission speed control switch 24 is set to correspond to a small value of N, for example, N=1. On the other hand, to decrease the transmission speed, the control switch 24 is set to correspond to a large value of N. In either case, since data is not sent during the N·T period, data transmission can be performed irrespective of the transmission speed of the data.

Other changes and modifications of the invention can be made. For example, when data is transmitted from a transmitter to a plurality of receivers, a plurality of the same receiving circuits as the receiving circuit 6 shown in FIG. 1 are connected to the transmission line 5. Also, the circuits as shown in FIGS. 4 and 5 can be modified in various ways. For example, the control switch for changing the data transmission speed is not limited to a digital type. Moreover, the signal sent from the transmitter is desirably a bipolar signal, but considering waveform distortion and so on it is not always limited thereto.

We claim:

1. A data transmission method of transmitting data represented by respective binary states in series during successive bit data times using a coded signal having a certain recognizable waveform, comprising the steps of:
   on a transmitting side,
   generating said coded signal in response to one of the binary states of the data to be transmitted;
   sending said coded signal during a first period of predetermined fixed duration, which forms part of a one bit data time in response to said one of the binary states of the data to be transmitted;
   not sending any signal during a second remaining period of said one bit data time, said second period having a duration which is variable with transmission speed, while said first period is unchanged regardless of a change of the transmission speed;
   not sending a signal during the whole duration of said one bit data time in response to the other of the binary states of said data to be transmitted; and
   on a receiving side;
   determining the binary state of the received data by the presence or absence of said coded signal sent from the transmitting side.

2. A data transmission method according to claim 1, further comprising the steps of:
   on the receiving side,
   converting a received signal of one coded form to a signal of another coded form; and
   generating a receiving clock signal in synchronism with the signal to which the received signal is converted.

3. A data transmission method according to claim 1, wherein said signal generated on said transmitting side is an RZ signal, and further comprising the steps of:
   on the transmitting side;
   converting said RZ signal of said one binary state to a bipolar signal for transmission as a pair of bipolar pulses during said first period of a one bit data time and;

on the receiving side;

converting each bipolar signal sent from the transmitting side to a RZ signal of said one binary state.

4. A data transmission system for transmitting data from a transmitting side through a transmission medium to a receiving side, comprising:

transmitting logic means on the transmitting side for producing a transmission signal during a first predetermined period, which forms part of a one bit time of data, in response to one of the binary states of the transmission data, and not producing said transmission signal during a second remaining period, other than said first period, of the one bit time of data, said second period having a duration which is variable with speed of data transmission; while said first period is unchanged regardless of a change of the transmission speed, and for producing no transmission signal in response to the other binary state of the transmission data in either of said first and second periods of the one bit time of data;

first converting means for converting the transmission signal produced from said transmitting logic means to a bipolar signal and for sending said bipolar signal consisting of a pair of bipolar pulses on said transmission medium during said first predetermined period of a one bit time of data;

second converting means on the receiving side for converting the bipolar signal sent through the transmission medium to a unipolar signal of one bit time of the transmission signal; and receiving logic means for detecting that said received signal is in a predetermined state to determine the binary state of the received data, and for generating a receiving clock synchronized with said received signal.

5. A data transmission system according to claim 4, wherein said transmitting logic means includes means for changing the transmission speed of data sent through the transmission medium.

6. A data transmission system for transmitting data represented by respective binary states from a transmission side through a transmission line to a receiving side, comprising:

first means for generating a basic pulse signal having a predetermined pulse width;

transmitting logic means having first circuit means including a counter operated in response to said basic pulse signal for producing, every time said counter counts a predetermined number of said basic pulses, a pulse signal having a period corresponding to a preselected multiple of the period of said basic pulse signal and being constituted by a first portion corresponding to the pulse width of said pulse signal and by a second portion corresponding to the remainder of the period of said pulse signal, and second circuit means responsive to said first circuit means for producing, for one of the binary states of the data to be transmitted, a transmission signal during said first portion of the period of said pulse signal and no transmission signal during said second portion of the period of said pulse signal, and for producing no transmission signal in either of said first and second portions of the period of said pulse signal when said data is in the other binary state;

second means for converting said transmission signal produced by said second circuit means of said transmitting logic means to a bipolar signal and for sending said bipolar signal consisting of a pair of bipolar pulses onto said transmission line during the first portion of the period of a pulse signal;

third means provided on said receiving side for converting said bipolar signal sent through said transmission line to a unipolar signal; and receiving logic means for detecting that said received signal is in a predetermined state to detect the binary state of the received data carried by said received signal, for thereby generating a receiving clock signal synchronized with said received signal.

7. A data transmitting apparatus for sending binary data to be transmitted through a transmission line, comprising:

(a) counter means for counting pulses;

(b) first means for generating a basic pulse signal containing pulses of a predetermined pulse width;

(c) second means connected to receive said basic pulse signal and the output of said counter means for operating said counter means with a clock signal having a period corresponding to a multiple of the period of said basic pulse signal and for generating a pulse signal containing successive pulses each having a fixed pulse width which is equal to a multiple of the period of said basic pulse signal every time a predetermined number of pulses in said clock signal are counted by said counter means as indicated by an output of said counter means; and (d) third means for gating the successive pulses in said pulse signal generated by said second means in dependence on the state of said binary data to thereby output a corresponding signal to be transmitted.

8. A data transmission apparatus according to claim 7, further comprising fourth means for converting the signal outputted from said third means to a bipolar signal to be sent out.

9. A data transmission apparatus according to claim 7, wherein a value is preset in said counter by switch means, the interval at which said pulse signals are generated by said second means being varied in dependence on said preset value.

10. A method of transmitting data represented by respective binary states, comprising:

(a) on a transmission side;

a first step of generating a basic pulse signal containing pulses of a predetermined pulse width;

a second step of operating a counter with a clock signal having a period corresponding to a multiple of the period of said basic pulse and for generating a pulse signal containing successive pulses each of which has a pulse width equal to a multiple of the period of said basic pulse signal every time a predetermined number of pulses in said clock signal is counted by said counter;

a third step of gating the successive pulses in said pulse signals generated at said second step in dependence on the state of said binary data to be transmitted, to thereby send out a corresponding signal;

(b) on a receiving side;

a fourth step of discriminatively determining the binary states of the transmitted data in dependence on said signal sent out at said third step.

11. A data transmitting method according to claim 10, wherein said pulse signal generated in the second step is an RZ signal, further comprising a step of converting said RZ signal to a bipolar signal on the transmission side, and a step of converting said bipolar signal to a RZ signal on the receiving side.

12. An apparatus for sending out binary data to be transmitted at a selected transmission speed, comprising:

first pulse generating means for generating a first train of pulses each having a predetermined pulse width and a predetermined period;

means for designating the transmission speed;

second pulse generating means connected to said designating means for receiving said first pulse train and for generating a second train of pulses each of a predetermined pulse width each time a preselected number of said first pulses is received said number varying in dependence on said transmission speed as selected by said designating means; and third pulse generating means for receiving said second pulse train and the binary data to be transmitted to thereby generate a third train of pulses in dependence on one of the binary states of said data and in synchronism with the pulses of said second pulse train, the width of said third pulses being dependent on the pulse width of the pulses of said second pulse train.

13. An apparatus according to claim 12, further including conversion means for receiving said third pulse train to convert the individual pulses thereof to bipolar signals.

14. An apparatus according to claim 13, wherein said first pulse generating means includes means for generating a fourth train of pulses each having a pulse width of T/4 and a period of T/2, and means responsive to said fourth pulse train for generating said first train of pulses having a pulse width of T/2 and a period of T;

said second pulse generating means including means for generating the second pulse train having a pulse width of T;

said third pulse generating means including means for generating the third pulse train having a pulse width of T/4; and said conversion means including means responding to the pulses of said third pulse train to produce a signal having in sequence a zero level of a duration T/4, a high level of the duration T/4, a zero level of the duration T/4 and a low level of the duration T/4.

15. An apparatus according to claim 12, wheren said designating means designates a specified number, said second pulse generating means includes a counter in which said specified number is initially set and which counts up the received pulses and outputs a pulse when the number of the counted pulses attains a predetermined value, said counter then being initialized.

16. An apparatus according to claim 12, wherein said third pulse generating means allows the pulses of said second pulse train to pass therethrough for one of the states of the binary data to be transmitted while preventing the passage of said second pulse train for the other state of said binary data.

* * * * *